(12) United States Patent
Kuang et al.

(10) Patent No.: US 8,164,218 B2
(45) Date of Patent: Apr. 24, 2012

(54) POWER CONVERTERS AND ASSOCIATED METHODS OF CONTROL

(75) Inventors: Naixing Kuang, Hangzhou (CN); Lei Du, Hangzhou (CN); Junming Zhang, Hangzhou (CN); Yuancheng Ren, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 320 days.

(21) Appl. No.: 12/505,399

(22) Filed: Jul. 17, 2009

(65) Prior Publication Data
US 2010/0045110 A1     Feb. 25, 2010

(30) Foreign Application Priority Data
Jul. 17, 2008 (CN) .......................... 2008 1 0045583

(51) Int. Cl.
*H02J 1/10* (2006.01)
*G05F 1/577* (2006.01)
(52) U.S. Cl. ........................................ 307/43; 323/267
(58) Field of Classification Search ................ 307/3, 43; 323/267
See application file for complete search history.

(56) References Cited

OTHER PUBLICATIONS

Pizzutelli, A. Novel control technique for single inductor multiple output converters operating in CCM with reduced cross-regulation, Feb. 2008, IEEE, pp. 1502-1507.*
Songrong Wu et al., Peak inductor current and differential-mode voltage control of single-inductor multiple-output buck converters in CCM, Mar. 2009, IEEE, pp. 683-687.*
Wing-Hung Ki et al., Single-inductor multiple-output switching converters, Aug. 2002, IEEE, pp. 226-231, vol. 1.*

* cited by examiner

*Primary Examiner* — Michael Rutland Wallis
(74) *Attorney, Agent, or Firm* — Perkins Coie LLP

(57) ABSTRACT

SIMO power converters and associated methods of control are disclosed herein. In one embodiment, a method of converting a signal input signal into multiple output signals includes supplying power to a plurality of output terminals based on a signal input signal, detecting a voltage at individual output terminals, determining an arithmetic relationship between the detected voltages of the output terminals, and adjusting the power supplied to the plurality of output terminals based at least in part on the determined arithmetic relationship between the detected voltages of the output terminals.

10 Claims, 6 Drawing Sheets

POWER CONVERTERS AND ASSOCIATED METHODS OF CONTROL

CROSS-REFERENCE TO RELATED APPLICATION(S)

This application claims priority to Chinese Application No. 200810045583.4, filed on Jul. 17, 2008, and incorporated herein by reference in its entirety.

TECHNICAL FIELD

The present disclosure relates to power converters; and more particularly, to single inductor multiple output (SIMO) power converters.

BACKGROUND

Switching circuits are widely utilized in a number of power supply applications. Three basic topologies of such switching circuits include (1) a buck converter, (2) a boost converter, and (3) a buck-boost converter. However, when multiple output are required, SIMO power converters can reduce cost and size of the device because only one inductor is used.

Conventional SIMO converters typically utilize a "priority" control scheme. According to the "priority" control scheme, when a SIMO converter detects that the voltage of one output is dropping too low, the SIMO converter would cut off power delivery to other output during subsequent cycles to compensate the output with the low voltage. This control scheme can cause high-ripple in the cut-off output because of a lack of power supply during the subsequent cycles. Other SIMO power converter techniques use digital control which are complicated and expensive. Accordingly, there is a need for efficient and cost-effective control circuits for SIMO power converters.

DETAILED DESCRIPTION

Specific details of several embodiments of the disclosure are described below with reference to power converters and associated methods of control. Moreover, several other embodiments of the converters may have different configurations, components, or procedures than those described in this section. A person of ordinary skill in the art, therefore, will accordingly understand that the converters and the associated methods of operation may have other embodiments with additional elements, or the invention may have other embodiments without several of the elements shown and described below with reference to FIGS. 1-4B.

Figure 1:
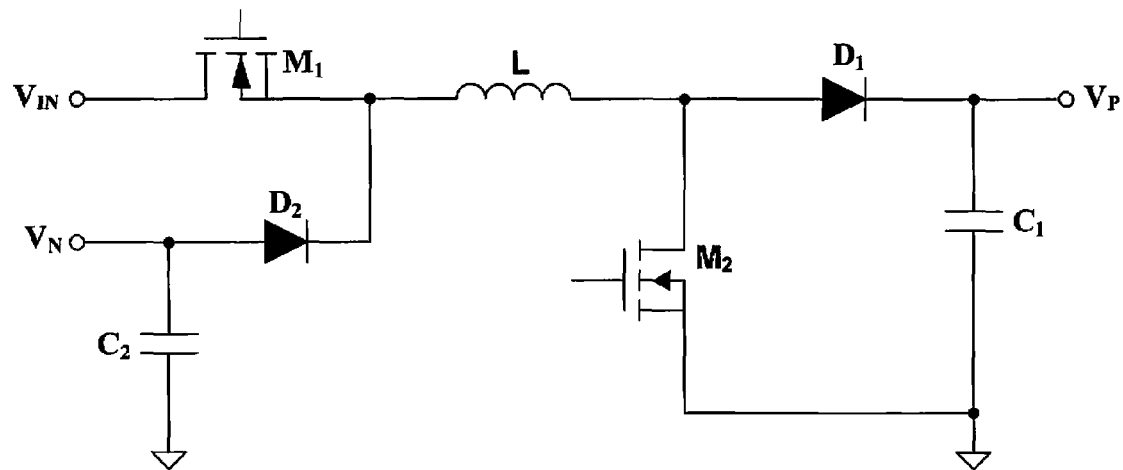
FIG. 1 is a schematic diagram of a SIMO circuit in accordance with embodiments of the disclosure.

FIG. 1 is a schematic diagram of a SIMO circuit in accordance with embodiments of the disclosure. As shown in FIG. 1, the SIMO circuit comprises an input $V_{IN}$, two output $V_P$ and $V_N$, an inductor L, two capacitors $C_1$ and $C_2$, two switches $M_1$ and $M_2$, two diodes $D_1$ and $D_2$ interconnected to one another. The individual control gate of switches $M_1$ and $M_2$ are coupled to a control circuit, an example of which is discussed in more detail below with reference to FIG. 3.

In certain embodiments, the switches $M_1$ and $M_2$ can individually include an N-channel MOSFET. In other embodiments, the switches $M_1$ and $M_2$ can include P-channel MOSFET or other suitable types of MOSFET. In further embodiments, the switches $M_1$ and $M_2$ can also include a transistor, an IGBT, and/or other suitable switching devices. In yet further embodiments, the diodes $D_1$ and $D_2$ can be replaced by suitable types of switches. Even though only two output are illustrated in FIG. 1, the SIMO circuit can also include three, four, or any other desired number of output. In further embodiments, the SIMO circuit may have other desired SIMO topologies.

Figure 2A:
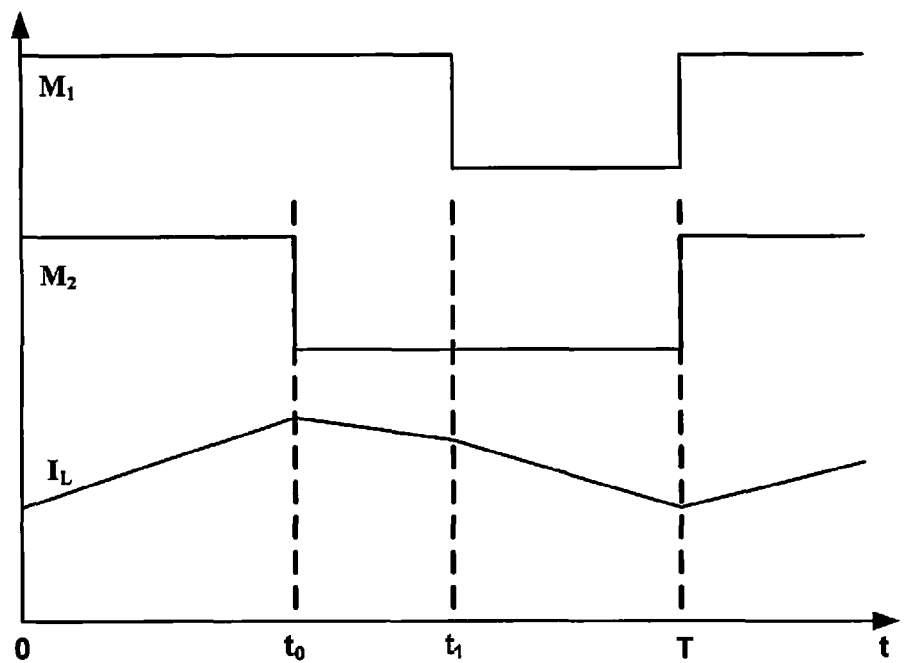
FIG. 2A depicts waveforms of an inductor current and switching signals in the SIMO circuit shown in FIG. 1 in one mode of operation.
Figure 2B:
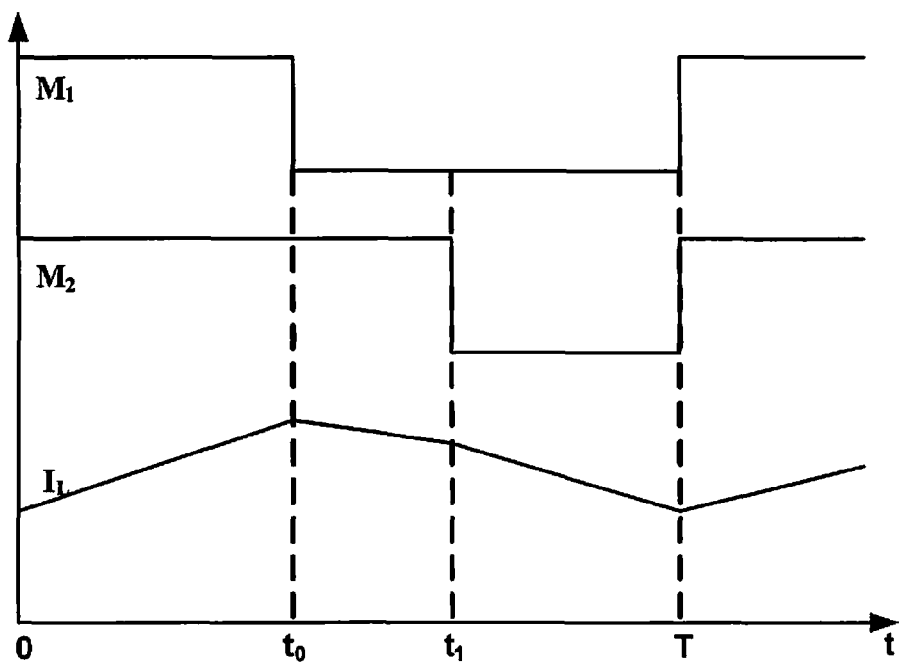
FIG. 2B depicts waveforms of an inductor current and switching signals in the SIMO circuit shown in FIG. 1 in another mode of operation.

In operation, the switch $M_1$ and the diode $D_2$ are turned on complementarily, while the switch $M_2$ and the diode $D_1$ are turned on complementarily. In certain embodiments, one switching cycle of the SIMO circuit may include three sub-periods when the system is in a continuous current mode (CCM): $0\sim t_0$, $t_0\sim t_1$, $t_1\sim T$, as shown in FIGS. 2A and 2B. In other embodiments, the switching cycle of the SIMO circuit may include other switching periods.

During a first sub-period $0\sim t_0$, the switches $M_1$ and $M_2$ are turned on simultaneously while the diodes $D_1$ and $D_2$ are turned off. The input $V_{IN}$, the switch $M_1$, the inductor L, and the switch $M_2$ form a current loop. The inductor current $I_L$ is increased linearly at a slope of $V_{IN}/L$ as the input $V_{IN}$ is supplied to the inductor L.

There may be two operating scenarios during a second sub-period $t_0\sim t_1$. According to operating scenario 1, the switch $M_1$ is turned on, the diode $D_1$ is freewheeling, and the switch $M_2$ and the diode $D_2$ are off. Then the input $V_{IN}$, the switch $M_1$, the inductor L, the diode $D_1$, and the capacitor $C_1$ form a current loop. As shown in FIG. 2A, the inductor current $I_L$ declines linearly at a slope of $(V_P-V_{IN})/L$, the input $V_{IN}$ and the inductor L are supplied to the capacitor $C_1$ and the load, thus providing the output $V_P$.

According to operating scenario 2, the switch $M_2$ is turned on, the diode $D_2$ is freewheeling, and the switch $M_1$ and the diode $D_1$ are off. Then the inductor L, the switch $M_2$, the capacitor $C_2$, and the diode $D_2$ form a current loop. As shown in FIG. 2B, the inductor current $I_L$ declines linearly at a slope of $V_N/L$ while the inductor L supplies power to the capacitor $C_2$ and the load, thus providing the negative output $V_N$.

During a third sub-period $t_1\sim T$, the switches $M_1$ and $M_2$ are turned off simultaneously, and diodes $D_1$ and $D_2$ are freewheeling. The inductor L, the diode $D_1$, the capacitor $C_1$, the diode $D_2$, and the capacitor $C_2$ form a current loop. The inductor current $I_L$ declines linearly at a slope of $(V_P-V_N)/L$ while the inductor L supplies power to the capacitors $C_1$, $C_2$ and the load.

Figure 3:
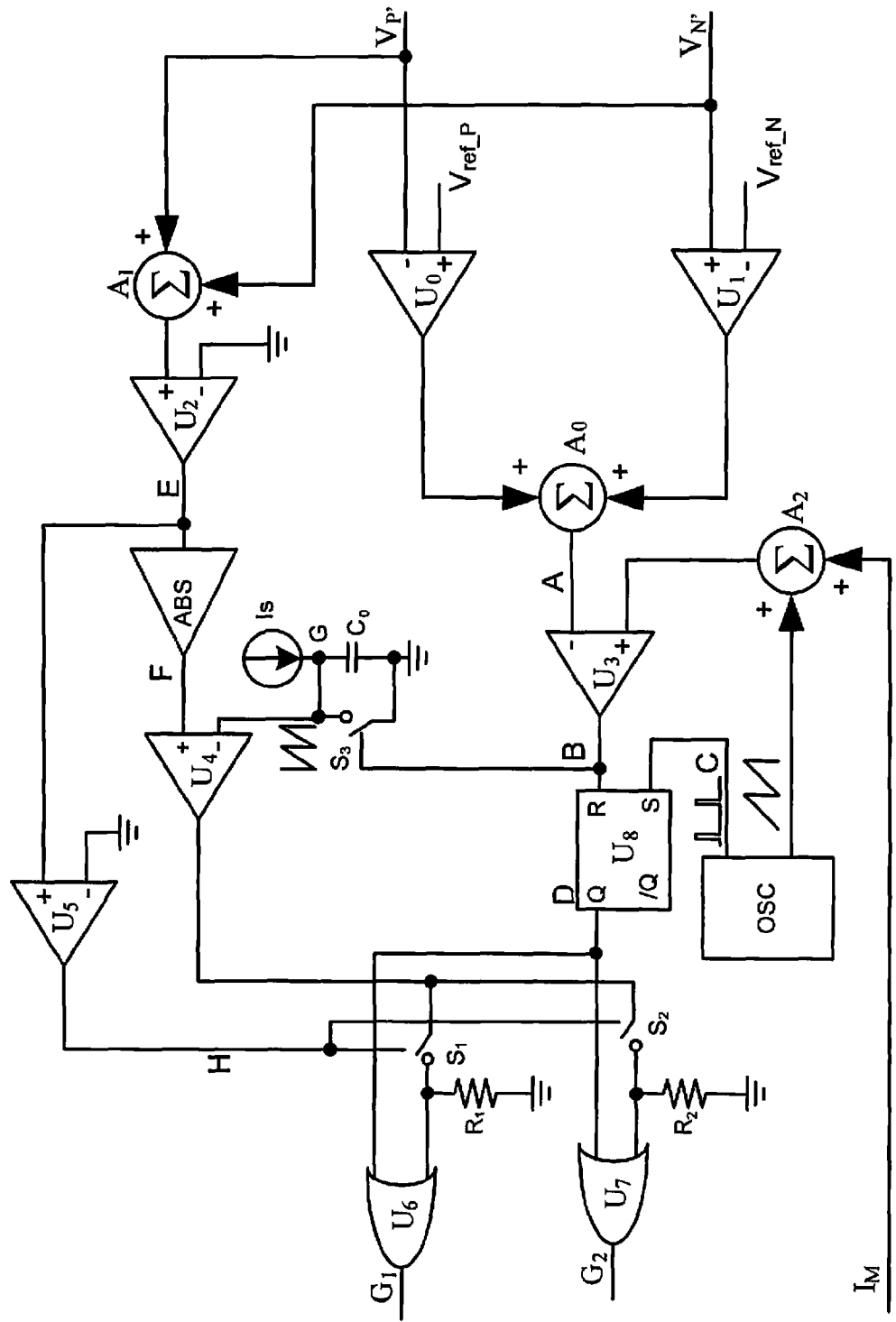
FIG. 3 is a schematic diagram of a control circuit useful in the SIMO circuit shown in FIG. 1 in accordance with embodiments of the disclosure.

FIG. 3 is a schematic diagram of a control circuit useful in the SIMO circuit shown in FIG. 1 in accordance with embodiments of the disclosure. As shown in FIG. 3, the control circuit can include two control loops to control the operation of the switches $M_1$ and $M_2$ (FIG. 1). In the illustrated embodiment, control loop 1 controls a peak current of the inductor current, i.e., a length of the first sub-period, while control loop 2 controls a length of the second sub-period, i.e., the duty-cycle difference between the two switches $M_1$ and $M_2$ in the SIMO circuit. Control loop 2 also determines which operating scenario to use during the second sub-period.

Control loop 1 comprises a peak-current control value setting circuit 1, an adder 2 (i.e., adder $A_2$), a first comparator 3 (i.e., comparator $U_3$), a slope signal generator 4, a first logic circuit 5, and a second logic circuit 6. In the illustrated embodiment, the peak-current control value setting circuit 1 comprises two operational amplifiers $U_0$, $U_1$, and a first calculator 11 (e.g., a an adder $A_0$). The slope signal generator 4 includes an oscillator OSC. The first logic circuit 5 includes a RS flip-flop $U_8$, and the second logic circuit 6 comprises a first OR gate $U_6$, a second OR gate $U_7$, a first switch $S_1$, a second switch $S_2$, a first resistor $R_1$, and a second resistor $R_2$ interconnected as shown in FIG. 3.

Control loop 2 comprises a switch duty-cycle difference control circuit 7 and the second logic circuit 6. In one embodiment, the switch duty-cycle difference control circuit 7 comprises an adder (i.e., adder $A_1$), a second operational amplifier $U_2$, an absolute value circuit ABS, a second comparator $U_4$, a third comparator $U_5$, a current source $I_S$, a capacitor $C_0$, and a switch $S_3$. The non-inverting input terminal of the operational amplifier $U_0$ receives a reference voltage $V_{ref\_P}$, and the inverting input terminal of the operational amplifier $U_0$ receives a sensed signal $V_{p'}$ of the system output $V_P$. The operational amplifier $U_0$ amplifies the difference between $V_{p'}$ and the reference voltage $V_{ref\_p}$ and supplies the amplified result to one input terminal of the adder $A_0$.

The inverting input terminal of the operational amplifier $U_1$ receives a reference voltage $V_{ref\_N}$ while the non-inverting input terminal of the operational amplifier $U_1$ receives another sensed signal $V_{N'}$ of the system output $V_N$. The operational amplifier $U_1$ amplifies the difference between $V_{N'}$ and the reference voltage $V_{ref\_N}$ and supplies the result to the other input terminal of the adder $A_0$. The adder $A_0$ adds the output of the operational amplifiers $U_0$ and $U_1$, and sends an output to the inverting input terminal of the third comparator $U_3$. One input terminal of the adder $A_2$ receives a signal $I_M$, which is a sensed current flowing through the switch $M_2$.

Without being bound by theory, it is believed that $I_M$ is equal to the inductor current $I_L$ of the SIMO circuit during the first sub-period $0 \sim t_0$. Therefore, the peak value of the inductor current $I_L$ is the peak value of $I_M$. It is also believed that the input terminal of the adder $A_2$ that receives the signal $I_M$ can also receive the inductor current $I_L$. The other input terminal of the adder $A_2$ receives one output of the oscillator OSC which can include a saw-tooth signal. The adder $A_2$ adds $I_M$ with the saw-tooth signal from the oscillator OSC, and sends its output to the non-inverting input terminal of the third comparator $U_3$.

The output terminal of the comparator $U_3$ is coupled to the reset terminal R of the RS flip-flop $U_8$ and the control terminal of the switch $S_3$. The set terminal S of the RS flip-flop $U_8$ receives the other output of the oscillator OSC which can include a clock signal. The output terminal Q of the RS flip-flop $U_8$ is coupled to the first input terminal of the first OR gate $U_6$ (i.e., the first input terminal of the second logic circuit) and the first input terminal of the second OR gate $U_7$ (i.e., the second input terminal of the second logic circuit).

One input terminal of the adder $A_1$ receives $V_P$, while the another input terminal receives $V_N$. The adder $A_1$ adds the two inputs and sends its output to the non-inverting input terminal of the second operational amplifier $U_2$.

The adders $A_0$ and $A_1$ can include any desired arithmetic unit to carry out a desired calculation. For example, the output of the adder $A_1$ can be $\beta_1 * V_P + \beta_2 * V_N$, where $\beta_1$, $\beta_2$ are coefficients that can be set to different values (even negative values) depending on particularity of each SIMO circuit. Furthermore, the number of the operational amplifier in control loop 1 is up to the number of the system output. It is two in this embodiment, thus there are two operational amplifiers $U_0$ and $U_1$.

In the illustrated embodiment, the inverting input terminal of the second operational amplifier $U_2$ is grounded, and the output terminal of the second operational amplifier $U_2$ is coupled to the input terminal of the absolute circuit ABS and the non-inverting input terminal of the comparator $U_5$. The inverting input terminal of the comparator $U_5$ is grounded, and the output terminal of the comparator $U_5$ (i.e., the first output terminal of the switch duty-cycle subtraction control circuit 7) is coupled to the fourth input terminal of the second logic circuit 6, to control the operation of the first switch $S_1$ and the second switch $S_2$. The output terminal of the absolute circuit ABS is coupled to the non-inverting input terminal of the comparator $U_4$. The inverting input terminal of the comparator $U_4$ is coupled to the output terminal G of the current source $I_S$ and one terminal of the capacitor $C_0$. The other terminal of the capacitor $C_0$ is grounded. The output terminal G of the current source $I_S$ is coupled to one terminal of the switch $S_3$ as well. The other terminal of the switch $S_3$ is grounded. As a result, the current source $I_S$, the capacitor $C_0$, and the switch $S_3$ form a saw-tooth generator. The falling edge of the saw-tooth signal generated by the saw-tooth generator is synchronized to the peak value of the inductor current.

As shown in FIG. 3, the output terminal of the comparator $U_4$ (i.e., the second output terminal of the switch duty-cycle difference control circuit) is coupled to the joint terminal of the first switch $S_1$ and the second switch $S_2$ (i.e., the third input terminal of the second logic circuit). The other terminal of the switch $S_1$ is coupled to the second input terminal of the first NAND gate $U_6$ and one terminal of the first resistor $R_1$. The other terminal of the switch $S_2$ is coupled to the second input terminal of the second NAND gate $U_7$ and one terminal of the second resistor $R_2$. The output terminal $G_1$ of the first NAND gate $U_6$ is coupled to the gate of the switch $M_1$ in the SIMO circuit of the system, while the output terminal $G_2$ of the second NAND gate $U_7$ is coupled to the gate of the switch $M_2$ in the SIMO circuit of the system, to control the operation of the switches $M_1$ and $M_2$. The other terminal of the resistor $R_1$ and the other terminal of the resistor $R_2$ are grounded.

Figure 4A:
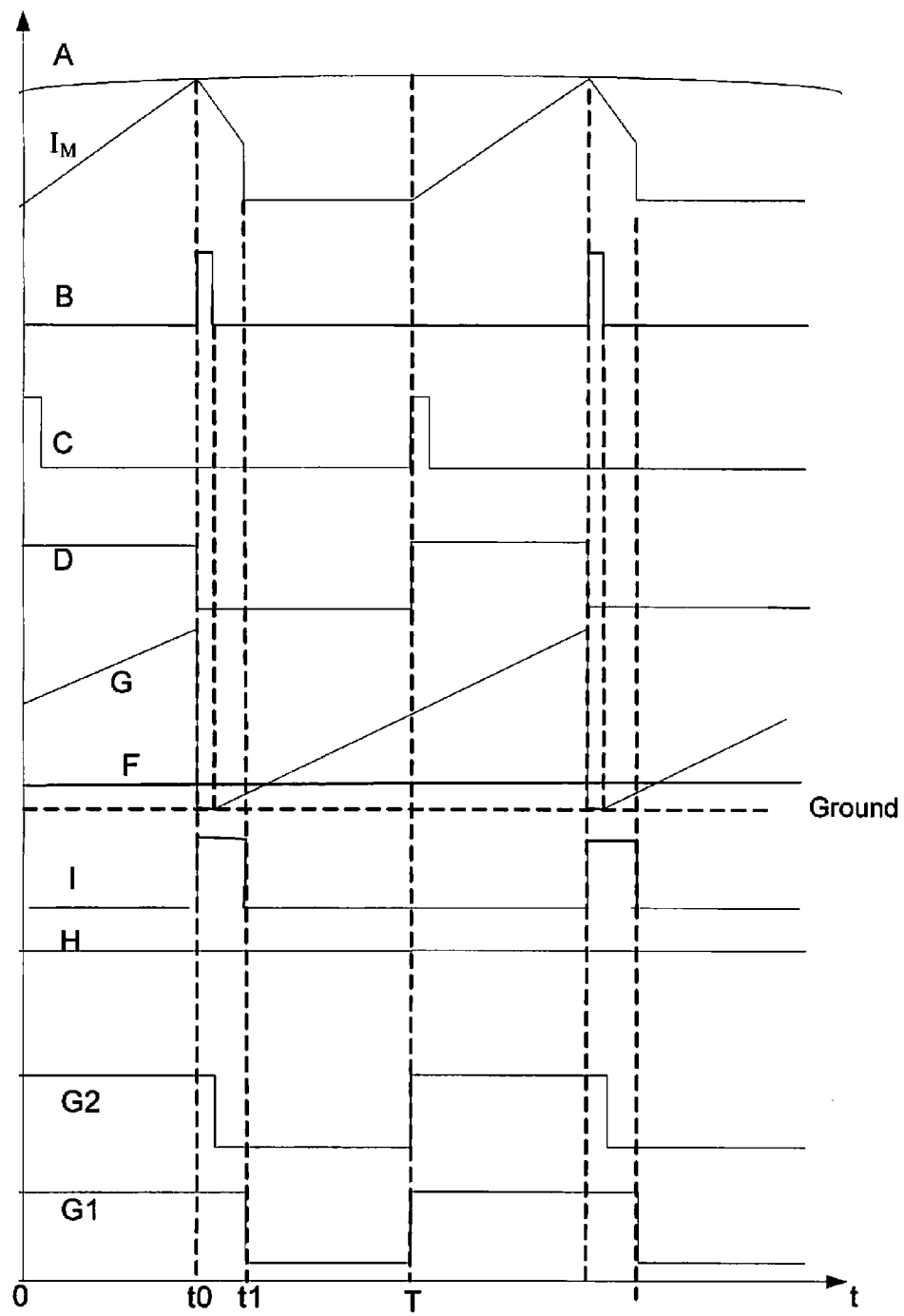
FIG. 4A depicts waveforms of the control circuit shown in FIG. 3 while the SIMO circuit shown in FIG. 1 is in one mode of operation.
Figure 4B:
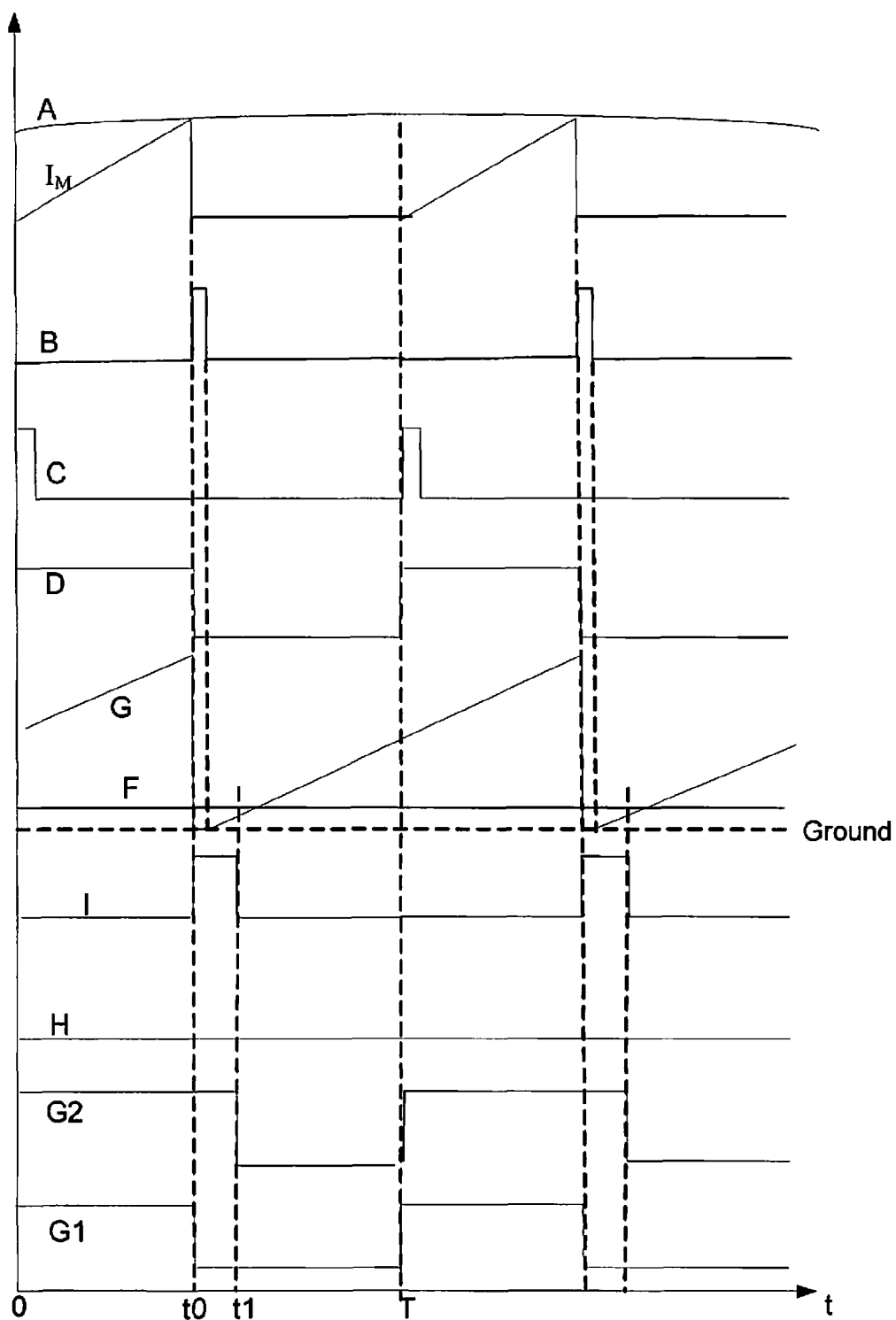
FIG. 4B depicts waveforms of the control circuit shown in FIG. 3 while the SIMO circuit shown in FIG. 1 is in another mode of operation.

FIG. 4A depicts waveforms of the control circuit when the SIMO circuit is operating according to operation scenario 1 during the second sub-period. FIG. 4B depicts waveforms of the control circuit when the SIMO circuit is operating according to operation scenario 2 during the second sub-period.

At the beginning of each operation cycle, i.e., at time 0, the set terminal S of the RS flip-flop is triggered by the clock signal C generated by the oscillator OSC. Thus the output Q of the RS flip-flop is set high, i.e., the signal D is high. Accordingly, the output $G_1$ of the first NAND gate $U_6$ and the output $G_2$ of the second NAND gate $U_7$ are high, causing the switches $M_1$ and $M_2$ in the SIMO circuit to be turned on. The input $V_{IN}$, the switch $M_1$, the inductor L and the switch $M_2$ form a current loop in the SIMO circuit. The input $V_{IN}$ is supplied to the inductor L, and the operation enters the first sub-period $0 \sim t_0$.

The adder $A_2$ adds $I_M$ with the saw-tooth signal generated by the oscillator OSC. Then the adder $A_2$ sends its output to the non-inverting input terminal of the comparator $U_3$. The saw-tooth signal may be utilized for slope compensation and/or for other suitable purposes. The adder $A_0$ adds the output from the operational amplifier $U_0$ and the operational amplifier $U_1$ to obtain an output signal A. When the current $I_M$ in the switch $M_2$ continuously increases to cause the output signal of the adder A2 to be greater than the signal A, i.e., at time $t_0$, the output signal B of the comparator $U_3$ is set high. Because the peak-current mode is applied to the first control loop, $I_M$ begins to decline when it reaches the value of the signal A. Thus, signal B is a short pulse. Signal B resets the RS flip-flop, namely, it turns the output Q of the RS flip-flop to low, i.e., signal D is low. Therefore, the output of the first NAND gate $U_6$ and the output of the second NAND gate $U_7$ are determined by the second input signals at their respective second input terminals.

As shown in FIG. 3, the operations of the first switch $S_1$ and the second switch $S_2$ are both controlled by signal H. The switch $S_1$ is turned on when signal H is low, and the switch $S_2$ is turned on when signal H is high. Thus, the switch $S_1$ and the switch $S_2$ are not turned on at the same time. Therefore, there is no more than one high-level signal between signal $G_1$ and signal $G_2$. Thus the system enters the second sub-period $t_0 \sim t_1$. In addition, signal B turns the switch $S_3$ to on, which pulls the output G of the current source $I_S$ to ground. The charges across the capacitor $C_0$ are discharged immediately, causing the voltage drop across the capacitor $C_0$ to be zero.

When the short pulse of the signal B is over, i.e., the level of signal B turns low, the switch $S_3$ is turned off, causing the current source $I_S$ to charge the capacitor $C_0$, thus the voltage across the capacitor $C_0$ is increased at a slope of $I_S/C$, where C is the capacitance of the capacitor $C_0$. Thus the output G of the current source $I_S$ can be a saw-tooth signal or other suitable types of signals. Such saw-tooth signal is sent to the inverting input terminal of the comparator $U_4$. The current source Is, the capacitor $C_0$ and the switch $S_3$ form a saw-tooth generator. Even though a particular saw-tooth generator is discussed above, in other embodiments, the saw-tooth generator can have other suitable components in other desired arrangements.

When the amplitude of $V_P$, is lower than the amplitude of $V_N$, the output of the adder $A_1$ is negative, causing the output signal E of the second operational amplifier $U_2$ and the output signal H of the comparator $U_5$ to be negative. The first switch $S_1$ is turned on and the second switch $S_2$ is turned off due to the low-level signal H, causing the input terminal of the first NAND gate $U_6$ to receive the output signal I of the comparator $U_4$, and also causing the second NAND gate $U_7$ to be decoupled from the signal I. The negative signal E becomes a positive signal F via the absolute circuit ABS. When the saw-tooth signal at the inverting input terminal of the comparator $U_4$ increases but is still lower than the signal F, signal I is high, resulting in a high-level signal $G_1$, and the switch $M_1$ in the SIMO circuit to be turned on. Moreover, the switch $M_2$ in the SIMO circuit is turned off, thus the system operation enters operation scenario 1 during the second sub-period: the switch $M_1$ is turned on, the diode $D_1$ is freewheeling, the switch $M_2$ and the diode $D_2$ are off. Then the input $V_{IN}$, the switch $M_1$, the inductor L, the diode $D_1$ and the capacitor $C_1$ form a current loop. The inductor current $I_L$ is declined linearly at a slope of $(V_P - V_{IN})/L$, the input $V_{IN}$ and the inductor L are supplied to the capacitor $C_1$ to increase the output $V_P$, as shown in FIG. 4A.

When the amplitude of $V_P$, is higher than the amplitude of $V_N$, the output of the adder $A_1$ is positive, causing signal E and signal H to be positive. The first switch $S_1$ is turned off and the second switch $S_2$ is turned on due to the high-level signal H, causing the input terminal of the second NAND gate $U_7$ to receive signal I, and the first NAND gate $U_6$ to be decoupled from signal I. The positive signal E becomes a positive signal F via the absolute circuit ABS. When the saw-tooth signal at the inverting input terminal of the comparator $U_4$ increased but is still lower than signal F, signal I is high, resulting in a high-level signal $G_2$, and the switch $M_1$ in the SIMO circuit to be turned off. Moreover, the switch $M_2$ in the SIMO circuit is turned on, thus the system operation enters case 2 during the second sub-period: the switch $M_2$ is turned on, the diode $D_2$ is freewheeling, the switch $M_1$ and the diode $D_1$ are off. Then the inductor L, the switch $M_2$, the capacitor $C_2$ and the diode $D_2$ form a current loop. The inductor current $I_L$ is declined linearly at a slope of $V_N/L$, the inductor L is supplied to the capacitor $C_2$ to increase the amplitude of the output $V_N$, as shown in FIG. 4B.

When the saw-tooth signal G increases to be higher than signal F, i.e., at time $t_1$, the output signal of the comparator $U_4$ is low. No matter which switch (either switch $S_1$ or switch $S_2$) is turned on, signal $G_1$ and signal $G_2$ are low. Thus the operation enters the third sub-period $t_1 \sim T$. The inductor L, the diode $D_1$, the capacitor $C_1$, the diode $D_2$ and the capacitor $C_2$ form a current loop. The inductor current $I_L$ is declined linearly at a slope of $(V_P - V_N)/L$, the inductor L is supplied to capacitors $C_1$, $C_2$ and the load. At time T, the oscillator OSC outputs a new clock signal C, the SIMO circuit enters a new operation cycle, and repeats the operation illustrated hereinbefore.

Figure 2C:
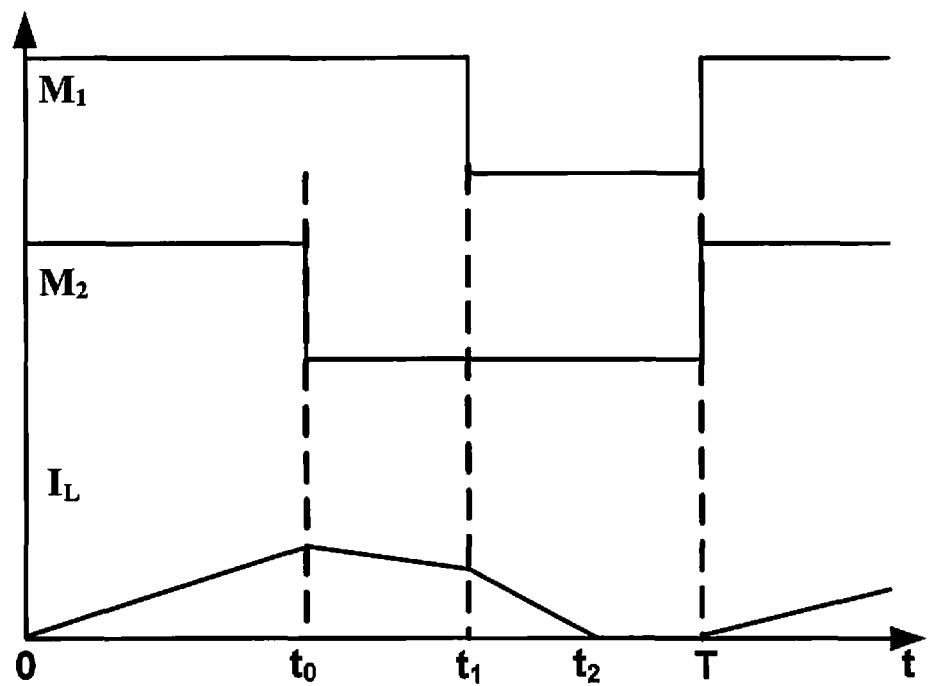
FIG. 2C depicts waveforms of an inductor current and switching signals in the SIMO circuit shown in FIG. 1 in yet another mode of operation.
Figure 2D:
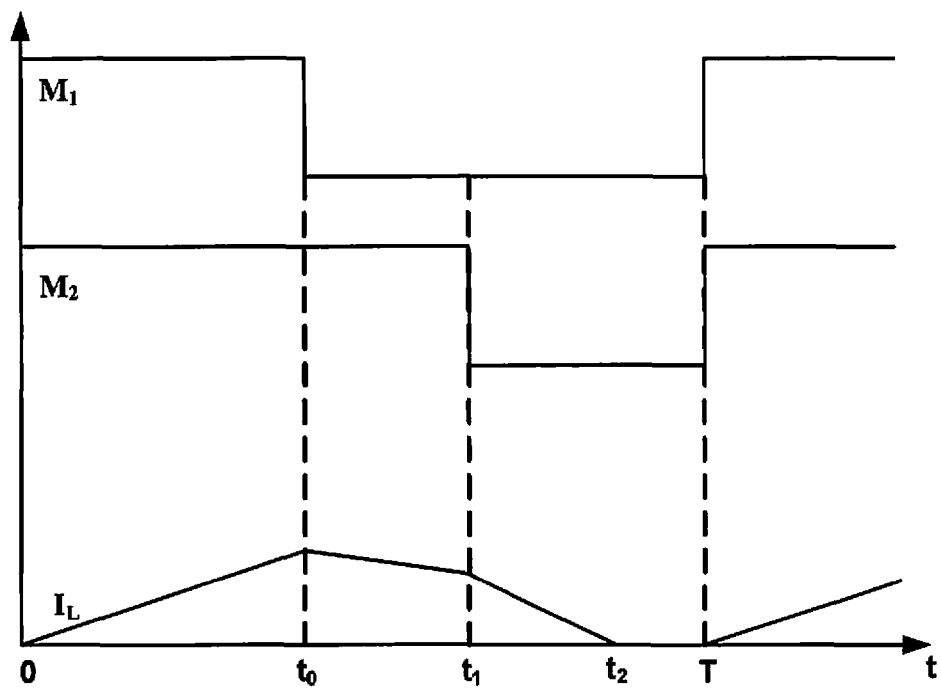
FIG. 2D depicts waveforms of an inductor current and switching signals in the SIMO circuit shown in FIG. 1 in a further mode of operation.

When the SIMO circuit is operating in a discontinuous current mode (DCM), the operation under scenario 1 and 2 are shown in FIG. 2C and FIG. 2D respectively. The operation during the first sub-period and the second sub-period are the same as that in CCM. However, after time $t_1$, the operation entered the third sub-period, at time $t_2$, the inductor current $I_L$ declines to zero, the diodes $D_1$ and $D_2$ are no longer freewheeling. At the same time, switches $M_1$ and $M_2$ are turned off, thus capacitors $C_1$ and $C_2$ are supplied to their respective load. At time T, the oscillator OSC outputs a new clock signal C, the SIMO circuit enters a new operation cycle, and repeats the operation illustrated hereinbefore.

During the first sub-period $0 \sim t_0$, switches $M_1$ and $M_2$ are both turned on; during the second sub-period $t_0 \sim t_1$, one of them is turned on while the other is turned off; during the third sub-period $t_1 \sim T$, both of them are turned off. Therefore, the foregoing SIMO circuit uses the algebraic relations of each output of the SIMO circuit to control the duty-cycle of each switch in order to control each output voltage of the SIMO circuit. As a result, several embodiments of the SIMO circuit can reduce voltage ripple commonly encountered in conventional circuits.

From the foregoing, it will be appreciated that specific embodiments of the invention have been described herein for purposes of illustration, but that various modifications may be made without deviating from the invention. For example, many of the elements of one embodiment may be combined with other embodiments in addition to or in lieu of the elements of the other embodiments. Accordingly, the invention is not limited except as by the appended claims.

We claim:
1. A single inductor multiple output (SIMO) system, comprising:
 a plurality of output terminals;
 a plurality of switches operatively coupled to the output terminals;

a first control loop configured to control a peak current in the SIMO system;
wherein the first control loop comprises:
a peak-current control value setting circuit configured to receive multiple sensed output of the SIMO system;
a slope signal generator configured to provide a slope signal and a clock signal;
an adder configured to receive a sensed current of the SIMO system at one input terminal and to receive the slope signal at another input terminal;
a first comparator configured to receive the output of the peak-current value setting circuit at one input terminal, and to receive the output of the adder at another input terminal;
a first logic circuit configured to receive the output of the first comparator at one input terminal, and to receive the clock signal at another input terminal; and
a second logic circuit configured to receive a first output of the second control loop at a first input terminal, to receive a second output of the second control loop at a second input terminal, to receive the output of the first logic circuit at a third input terminal, and to provide multiple control signals to control terminals of the multiple switches, respectively; and
a second control loop electrically coupled to the first control loop, the second control loop being configured to control a duty-cycle difference between the switches to achieve a desired voltage at the individual output terminals.

2. The SIMO system of claim 1, wherein the second control loop comprises a switch duty-cycle difference control circuit configured to receive the multiple sensed output of the SIMO system at multiple input terminals, respectively.

3. The SIMO system of claim 1, wherein the peak-current control value setting circuit comprises:
a plurality of operational amplifiers, wherein each operational amplifier is configured to receive a sensed output voltage of the SIMO system at one input terminal and to receive a corresponding reference voltage level at another input terminal; and
a first arithmetic unit configured to receive the output of each operational amplifier at multiple input terminals, and to provide an output of the peak-current control value setting circuit to one input terminal of the first comparator.

4. The SIMO system of claim 3, wherein a number of the operational amplifiers is based at least in part on a number of output terminals in the SIMO system.

5. The SIMO system of claim 1, wherein the slope signal generator is an oscillator.

6. The SIMO system of claim 1, wherein the first logic circuit is a RS flip-flop.

7. The SIMO system of claim 1, wherein the second logic circuit comprises a first OR gate, a second OR gate, a first resistor, a second resistor, a first switch, and a second switch.

8. The SIMO system of claim 2, wherein the switch duty-cycle difference control circuit comprises:
a second arithmetic unit having multiple input terminals;
a second operational amplifier configured to receive the output of the second arithmetic unit at one input terminal, while the other input terminal of the second operational amplifier is grounded;
an absolute value circuit configured to receive the output of the second operational amplifier;
a second comparator configured to receive the output of the absolute value circuit at one input terminal, to receive a saw-tooth wave signal at another input terminal, and to provide the first output of the second control loop;
a third comparator configured to receive the output of the second operational amplifier at one input terminal with the other input terminal of the second comparator grounded; and
a saw-tooth generator configured to receive the output of the first comparator and to provide a saw-tooth signal.

9. The SIMO system of claim 8, wherein the saw-tooth generator comprises a current source, a capacitor, and a switch configured to generate the saw-tooth signal.

10. The SIMO system of claim 8, wherein a falling edge of the saw-tooth signal generated by the saw-tooth generator is synchronized to the peak current of the SIMO system.

* * * * *